Oct. 22, 1963
R. L. LONGMIRE
3,107,601
FILTRATION AND RECIRCULATION SYSTEM
FOR DEEP FAT COOKING APPARATUS
Filed Sept. 2, 1958
2 Sheets-Sheet 2
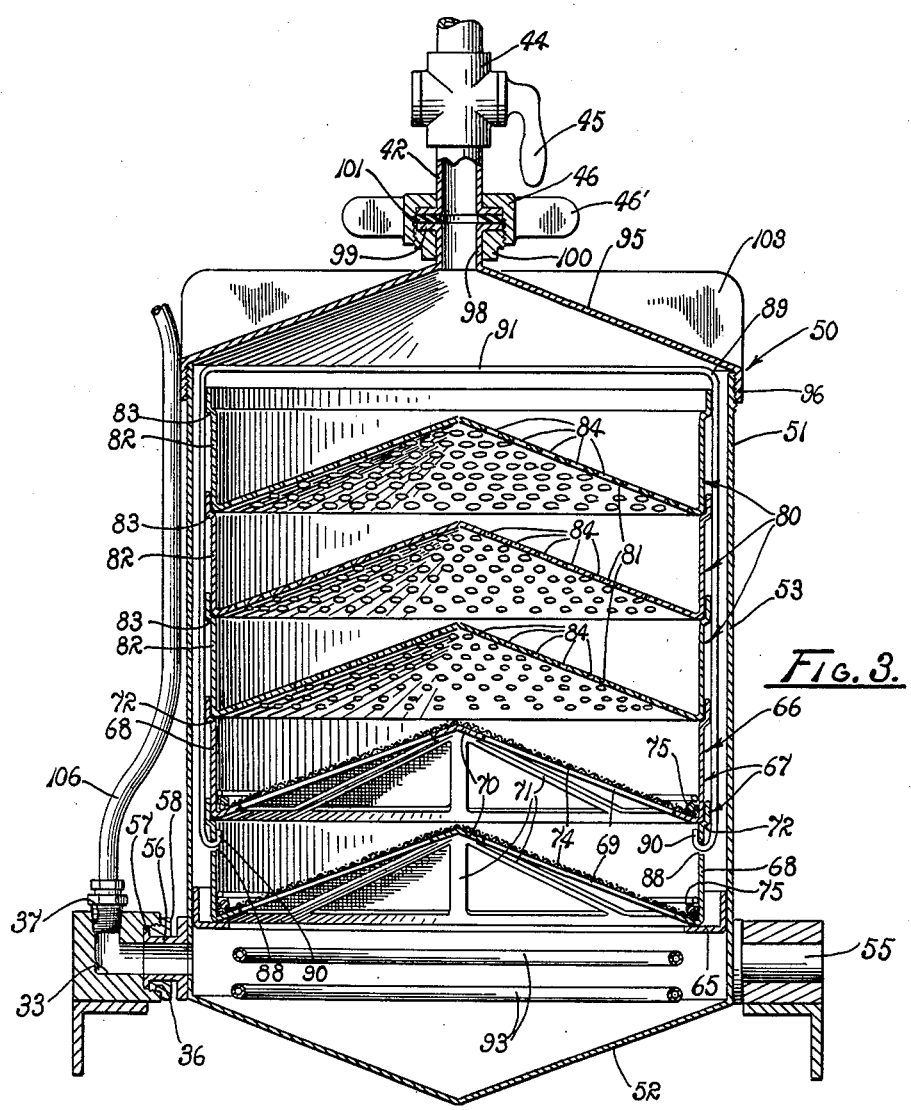
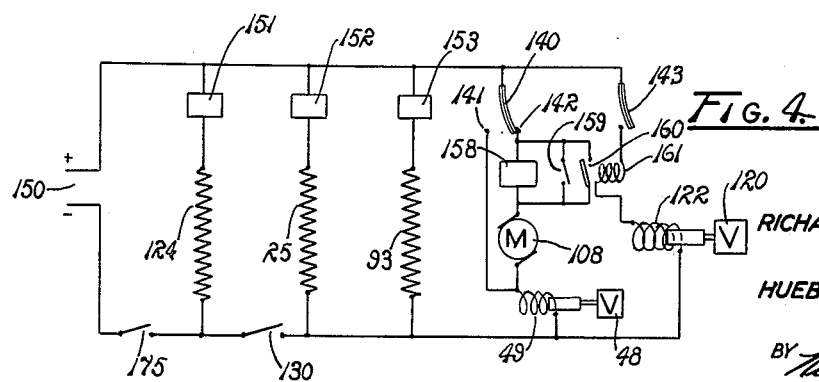
RICHARD L. LONGMIRE
INVENTOR
HUEBNER & WORREL
ATTORNEYS 3,107,601
FILTRATION AND RECIRCULATION SYSTEM FOR DEEP FAT COOKING APPARATUS
Richard L. Longmire, Fresno, Calif.
(576 Bonita, Las Vegas, Nev.)
Filed Sept. 2, 1958, Ser. No. 758,369
7 Claims. (Cl. 99—330)

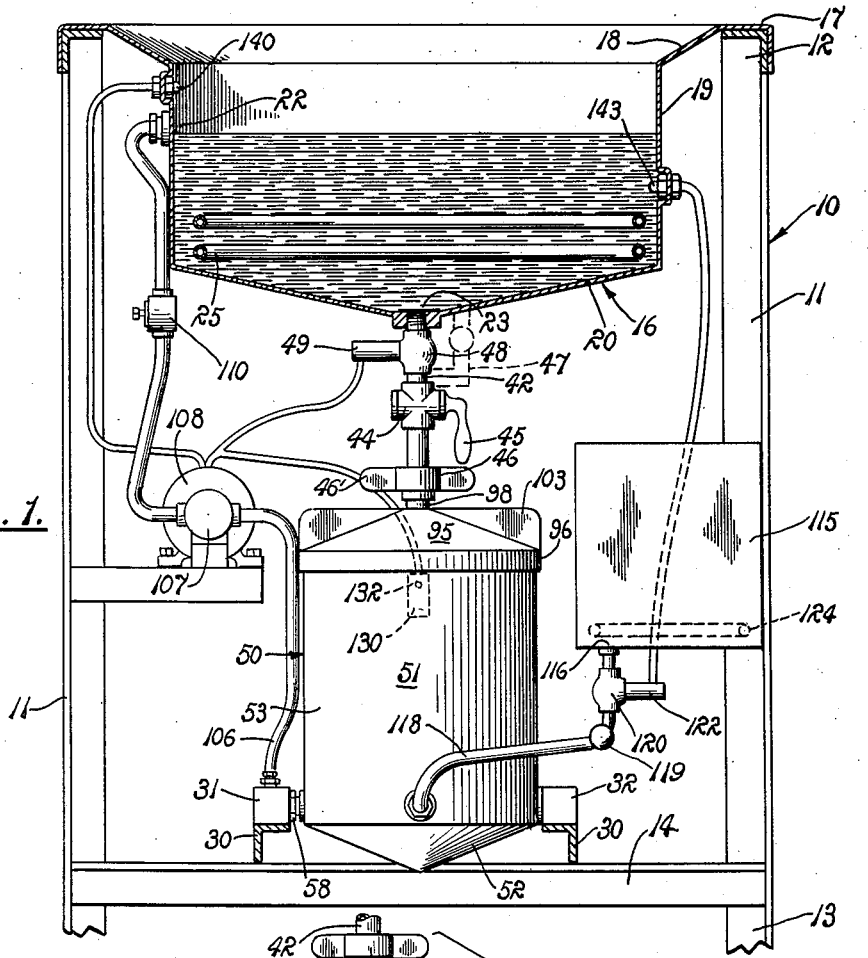

The present invention relates to a filtration and recirculation system for a deep fat cooking apparatus and more particularly to such a system which is automatically and continuously operable, if desired, and which functions to clean and increase the life of cooking grease employed and to minimize hazards in connection with the handling of the grease.

It is well-known to employ a deep fat fryer for the purpose of preparing certain foods such as french fried potatoes, fish, and the like, in restaurants, drive-ins and other eating places. A deep fat fryer usually includes a tank or container mounted in upright position and nearly filled with grease which is usually heated to a temperature of about 375° F. The food to be fried is placed in a perforated basket and immersed for a predetermined time in the hot grease. Frying of foods in grease in this manner causes the grease to break down chemically forming acids and carbon particles which lend an undesirable taste and color to the food and which may cling thereto. Accordingly, it is known that cooking grease loses its effectiveness as a cooking medium after a relatively short period of use. Even with good grease and with regular straining, only above five or six days life can be obtained from grease by restaurants continuously cooking therein.

An average restaurant currently may strain its frying grease every twelve to fourteen hours in order to get the maximum life and cooking qualities therefrom. For this purpose deep fry tanks usually provide downwardly disposed drainage outlets and valves connected to the outlets through which the grease may be removed from the tank. The conventional straining procedure is first to position a bucket underneath the outlet of the fry tank; to tension a filter cloth over the bucket; and to open the valve to allow the grease gravitationally to drain out of the tank, through the cloth, and into the bucket. In order to maintain maximum flowability of the grease, to reduce loss of good grease, and to improve filtration, the straining procedure is usually conducted at temperatures above 300° F. and usually around the normal cooking temperatures. After the grease has been completely strained, it is lifted in the bucket and poured back into the tank either for further straining or for further use. At the same time new grease may be added to replenish that which has been expended.

In addition to the possibilities that the grease may splatter or spill while draining or pouring there are several other perhaps even more significant disadvantages. For example, as grease strains through the filter cloth and into the bucket, air pressure builds up between the level of the filtered grease in the bucket and the filter cloth slowing down the operation considerably. In addition, some attendants may carelessly leave the outlet valve on the tank open with a full bucket of grease therebelow and proceed to wash out the deep fry tank. If water is poured into the tank, it then drains down into the bucket of grease and, being heavier than the grease, sinks to the bottom of the bucket. At the temperature of the grease, this water rapidly turns into steam creating excessive pressures underneath the grease and resulting in an explosion. These and other hazards are well recognized in the restaurant business. The insurance rates demonstrate the frequency and severity of burns accidentally incurred from cleaning and/or changing deep fat frying grease. Because of these hazards and/or the insurance rates, some restaurants hesitate to filter their grease at all or as frequently as it might be desirable. This results in reduced grease life and decrease in the quality of foods prepared.

Accordingly, it is an object of the present invention to provide a filtration and recirculation system for a deep fat cooking apparatus.

Another object is to provide such a system which is optionally automatically and continuously operable.

Another object is to minimize the hazards associated with the changing, cleaning, or other handling of grease used in deep fat cooking apparatus.

Another object is to increase the life of grease used for deep fat cooking purposes.

Another object is to minimize chemical breakdown, and the formation of acids and carbon particles in cooking grease.

Another object is to minimize the expense in connection with the operation of a deep fat cooking apparatus.

Another object is to improve the flavor and appearance of foods prepared in a deep fat frying apparatus.

Another object is to provide a constant filtration and recirculation system for a deep fat frying apparatus which is safe to operate and automatically controls temperatures and grease levels.

Another object is to provide an apparatus of the nature described which is easy to clean and otherwise maintain.

Another object is to provide such a system in which grease is automatically replenished as it is used to maintain a substantially uniform quantity of grease in the system at all times.

Another object is to provide a system of the type described which can be installed in new or existing cooking facilities.

These, together with other objects, will become more fully apparent upon reference to the following description and accompanying drawings.

In the drawings:

FIG. 1 is a front elevation of a filtration and recirculation system embodying the principles of the present invention and shown incorporated in a deep fat cooking apparatus which is partially illustrated in vertical cross section.

FIG. 2 is a fragmentary side elevation of a filter and other structure employed in the present invention.

FIG. 3 is a somewhat enlarged longitudinal vertical section of the filter employed in the subject system.

FIG. 4 is a schematic electrical circuit used with the system of the present invention.

Referring more particularly to the drawings, a support, generally indicated by the numeral 10, includes a plurality of legs 11 having upper and lower ends 12 and 13 and a crossbar 14. The deep fat cooking apparatus of the subject invention provides a tank 16 rigidly mounted in the support 10 in upright position and including an annular rim 17 rested on the upper ends of the legs, a frustoconical upper flange 18, a cylindrical side wall 19, and a generally conical downwardly convex bottom wall 20. The side wall of the tank provides an upper liquid fat inlet 22, and the bottom wall provides a downwardly disposed concentric liquid fat outlet 23 located substantially at the apex of the bottom wall. The tank may be externally covered with insulation, not shown, for heat retentive purposes, to maintain more constant cooking temperatures, and for economy of operation.

Brackets 30 are transversely adjustably mounted on the bar 14 in the support 10 in spaced relation to each other, and a pair of spaced bearing blocks 31 and 32 are rigidly secured to the brackets. The bearing blocks have opposed, coaxial, horizontally disposed sockets 33 and 34. The socket 33 in the bearing block 31, hereinafter referred to as the fluid conducting bearing block, constitutes a fluid passage having an internally threaded inlet 36 and an outlet 37, as seen in FIG. 3.

An elongated rigid outlet conduit 42 provides an upper end connected by any suitable means to the outlet 23 in the bottom wall 20 of the tank 16 and a downwardly extended lower end. A manual three position outlet valve 44 is connected in the outlet conduit so as to divide it into upper and lower sections and provides a handle 45 for moving the valve into its various positions. The manual outlet valve has an open position connecting the upper section of the outlet conduit to the lower section for passage of fluid therethrough; a closed position blocking any fluid passage through the outlet conduit; and a filter bleeding position blocking passage of fluid from the upper section of the outlet conduit to the lower section thereof but opening the lower section of the conduit to the atmosphere. An internally threaded female fitting 46 having ears 46' is slidably mounted on the lower end of the outlet conduit for a purpose to be described. An automatic tank valve 48 is also connected in the outlet conduit 42 above the outlet valve 44 and has open and closed positions. An electrical tank solenoid 49 is connected to the tank valve for moving it between its open and closed positions. The automatic valve is normally spring-urged into closed position. A by-pass 47 including a manual valve may be provided in parallel with the automatic tank valve in the event that it is desired to disable action of this valve, as will be evident from the following description.

A filter 50 includes a housing 51 having a substantially conical lower wall 52, a cylindrical side wall 53, and an open upper end. A solid trunnion 55 is rigidly outwardly extended from one side of the wall 53 and journaled in the socket 34 of the bearing block 32. A tubular fluid conducting trunnion 56 is rigidly outwardly extended from the side wall 53 in coaxial alignment with the solid trunnion and is journaled in the inlet 36 of the socket 33 in the bearing block 31. The tubular trunnion provides an annular head 57 seated in the socket 33. An annular externally threaded nut 58 is rotatably and axially slidably mounted in the tubular trunnion for screw-threading into the inlet 36 of the socket into engagement with the head 57 thereby precluding axial outward movement of the bearing block 31 and the tubular trunnion. The filter housing is mounted in the described manner for pivotal movement around a substantially horizontal axis defined by the trunnions between an upright operating position in substantially vertically aligned coaxial relationship with the tank, as shown in FIGS. 1 and 3, and a laterally outwardly inclined or tilted cleaning and replacement position, as shown in FIG. 2. A stop 60 is removably mounted by bolts, as 61, in the support 10 on the brackets 30 forwardly of the filter. When the housing is in said cleaning and replacement position, it abuts the stop so as to be limited to a predetermined degree of angular inclination. However, upon release of the bolts 61, the stop can be removed so as to enable complete inversion of the filter housing for dumping the contents thereof.

The filter housing 51 has a lower annular support ledge 65 mounted internally therein in upwardly spaced relation to the trunnions 55 and 56. A filter cartridge 66 is longitudinally slidably fitted in the housing and includes a plurality of lower fine filter units 67 each having an upwardly extended annular band 68, and a conical portion 69 concentric to the housing and extended upwardly therein. Each conical portion provides a central hub 70 and a plurality of peripherally spaced webs 71 rigidly interconnecting the hub and the band. Each of the bands also provides an upper offset annular shoulder 72, the upper fine filter unit being fitted on the shoulder of the lower fine filter unit. Further, each fine filter unit has a fine mesh cloth 74 stretched over the webs and providing a circular edge in the corner between the conical portion and its respective band. Snap rings 75 are releasably fitted in the filter units for holding the cloths in place.

The cartridge 66 also includes a plurality of upper coarse filter units 80 each of which has a conical portion 81 concentric to the housing 51 and extended upwardly therein and an annular band 82 relatively interfitted on annular shoulders 83 of the filter units 80, the lowermost shoulder 83 being fitted on the shoulder of the uppermost fine filter unit 67. The conical portions of the coarse filters are provided with a plurality of apertures 84 spaced therein throughout substantially their entire surfaces. The diameter of the holes in the coarse filter units are successively smaller from the upermost to the lowermost coarse filter unit for successively increased filtering action. It is to be noted that the cloths 74 are of even finer mesh with resultant greater filtering action than the lowermost coarse filter unit.

The lowermost fine filter unit 67 provides opposed diametrically related openings 88. A U-shaped bail 89 provides lower ends 90 releasably fitted in the openings 88 and a handle 91 extended diametrically across the top of the upper coarse filter unit 80. The cartridge 66 can be slidably removed from the housing or inserted therein by grasping the bail and pulling outwardly or pushing inwardly thereon. It is also to be noted that the filter includes a heater 93 mounted in the lower portion of the housing 51 below the support ledge 65.

The filter 50 additionally has an upwardly substantially convex conical cover 95 providing an annular flange 96 screw-threaded on the side wall 53 of the housing 50 in closing relation to the upper end of the housing. Alternatively, the cover may be attached to the housing by a quick-release connection, of the bayonet-type for example, so that it is removed or replaced by only a fraction of a full turn of the cover relative to the housing. The cover provides a concentric inlet opening at its apex, and an inlet duct 98 is rigidly upwardly extended therefrom and provides a radial flange 99. An annular externally threaded male fitting 100 is rotatably and axially slidably fitted on the inlet duct and is adapted to be screw-threaded into the fitting 46 when the outlet conduit 42 and the inlet duct 98 are in coaxial alignment. A packing washer 101 preferably is interposed at the lower end of the outlet conduit and the radial flange 99. Diametrically related handling wings 103 are also provided on the cover 95.

An elongated delivery conduit 106 provides a lower end connected to the outlet 37 of the socket 33 in the fluid conducting bearing block 31 and an upper end connected to the inlet 22 in the tank 16. A fluid pump 107 is connected in the delivery conduit and is mounted in the support 10. The pump is provided for recirculating liquid fat from the tank, through the filter 50 and back into the tank. Used or contaminated fat is discharged from the tank by gravity into the filter whereupon, after filtration, it is pumped upwardly through the delivery conduit into the tank. An electrical motor 108 is mounted in the support 10 and has driving connection to the pump. Preferably, the delivery conduit extends alongside of and in closely adjacent relation or contact with the filter housing 51 and the tank 16, as shown, in an effort to minimize temperature drop in the system. A pressure regulator 110 is connected in the delivery conduit between the pump and the inlet to the tank so that grease is pumped slowly, and does not squirt or stream out into the tank. If desirable, the pump may include a by-pass, not shown, to recycle grease if the pressure built up between the pump and the regulator exceeds a predetermined level.

A liquid fat reservoir 115 includes a downwardly disposed outlet 116 and an open top 117 which may optionally be provided with a removable cover, not shown. A flexible reservoir hose 118 connects the outlet of the reservoir to the filter housing 51 adjacent to its lower end. The outlet of the reservoir is maintained above the point of discharge of the hose for enabling gravitational flow therethrough. Manual and automatic reservoir control valves 119 and 120, respectively, are serially connected in the reservoir hose and provide open and closed positions whereupon liquid fat is released for gravitational flow into the filter when both of the valves are open and whereupon such flow is blocked when one or both of the valves are closed. An electrically operated solenoid 122 is mounted in the support and connected to the automatic valve for moving it between its open and closed positions. A reservoir heater 124 is provided in the reservoir especially for use if cooking fat is employed which is solid at room temperatures. It is to be noted that the words "fat" and "grease" are used interchangeably throughout the present description.

A microswitch 130 is mounted in the support 10 and has open and closed positions although being spring-urged into open position. The microswitch also provides an actuating button or element 132 extended forwardly outwardly therefrom, adapted to close the microswitch when depressed, but allowing the microswitch to open under spring urgence when released. The microswitch is mounted adjacent to the filter housing 51 so that when the housing is in its upright operating position, the housing engages the button to close the microswitch. When the housing is pivoted outwardly into its cleaning and replacement position, pressure on the button is relieved allowing the microswitch to open.

An upper thermostatic fat level control switch 140 having two alternately and oppositely closed contacts 141 and 142 is mounted in a recess in the side wall 19 of the tank 16 and is adapted to extend generally radially inwardly of the tank for immersion into liquid fat in the tank upon elevation of the fat to a predetermined level. A lower thermostatic fat level control switch 143 is extended into the tank below the upper thermostatic switch and is also mounted in a recess. The lower switch is adapted to be submerged in liquid fat in the tank under normal operating conditions of the apparatus. Each of the thermostatic switches includes bi-metallic switch blades adapted to engage or disengage their respective contacts incident to change of temperature. The blade of the upper thermostatic switch engages the contact 142 at room temperatures and is adapted to engage the contact 141 when immersed in liquid fat at a predetermined elevated temperature. When the fat cools or its level falls below the upper thermostatic switch the switch blade thereof returns to engagement with the contact 141. The lower thermostatic switch, although closed at room temperatures, is open during normal operation of the cooking apparatus since it is immersed in liquid fat in the tank which fat is sufficiently hot to open the switch. If the fat level falls below the lower thermostatic switch, the latter cools and its blade and single contact close, that is, move into engagement.

Referring to FIG. 4, an electrical system employed with the present invention is illustrated and includes a source of electrical voltage 150. The reservoir heater 124 is connected in series with an adjustable reservoir temperature control thermostat 151 and this series combination is connected across the source of voltage. The tank heater 25 and the filter heater 93 both have adjustable temperature control thermostats 152 and 153 individually connected in series therewith, and each of these series combinations is connected in parallel with the source of voltage. Further, the electrical system provides for connection of the electrical motor 108 in series with the contact 142 of the upper control thermostatic switch 140 and this series combination is connected across the source of voltage. It is to be noted that the other contact 141 of the upper thermostatic switch is connected between the motor and the solenoid 49. An adjustable circuit interrupting timer 158 is connected in series with the motor for energizing and de-energizing the motor intermittently, by opening and closing the circuit, in the event that constant recirculation is not desirable. Shorting circuits for disabling the timer include a manual switch 159 and the contacts 160 of a relay 161 connected individually in parallel with the timer. Also the outlet solenoid 49 is connected in series with the motor so that whenever the motor is energized, the solenoid is energized to keep the valve 48 open, and whenever the motor is de-energized and the upper thermostatic switch is at room temperatures, the solenoid is de-energized to close the valve 48. The electrical solenoid 122 is connected in series with the relay 161 and the lower thermostatic control switch and this series combination is connected in parallel with the source of voltage. The microswitch 130 is connected in series with the source of voltage and the parallel circuits including the tank and filter heaters, the motor, and the reservoir solenoid so that each of these parallel circuits are de-energized when the microswitch opens. Preferably, a master control switch 175 is connected in the electrical system for energizing and de-energizing these parallel circuits as well as the parallel circuit including the reservoir heater.

*Operation*

The operation of the described embodiment of the subject invention is believed to be readily apparent and is briefly summarized at this point. In order initially to prepare the subject cooking apparatus for deep fat frying, for example, the manual valves 44 and 119 are moved into their closed positions, and the filter 50 is placed in its upright operating position with the outlet conduit 42 connected to the inlet duct 98. Of course, the filter cartridge 66 is properly assembled and inserted within the filter housing 51. The tank 16 is supplied with a quantity of cooking fat up to a desired level at which the lower thermostatic switch 141 is immersed in the fat. Furthermore, the reservoir 115 is filled with a quantity of cooking fat. Either fat which is solid or liquid at room temperatures may be used. The thermostats 151, 152 and 153 are adjusted to the temperatures desired in their respective reservoir, tank, and filter. Usually the grease in the reservoir should be kept just flowable at about 90° F. while in the tank it is maintained at cooking temperature of about 370–375° F. The temperature of the grease in the filter is somewhat below cooking temperature.

The valve 44 is opened by means of the handle 45, and the by-pass 47 is closed. The master control switch 175 is also closed thereby to energize the heaters 25, 93 and 124, and the motor 108. After the grease in the tank 16 is at the desired temperature so that the thermostatic switch 143 is open, the manual valve 119 is opened. Liquid fat in the tank 16 gravitates downwardly through the outlet conduit 42 into the filter 50. The grease passes through the filter and is pumped upwardly through the delivery conduit 106 by the pump 109 back into the tank through the inlet 22. It may be necessary to add more grease as the apparatus is first placed into operation to keep the grease in the tank at a desired level because of the grease drained from the tank and passing through the filter.

Assuming the grease has been used for cooking purposes and contains particles to be filtered therefrom, the action of the filter cartridge 66 is considered. Grease drops downwardly onto the uppermost coarse filter unit 80 where it flows downwardly along the conical portion 81 toward the band 82. The larger foreign particles in the grease collect on the conical portion whereas the preliminarily filtered grease passes through to the next filter unit. It will be evident that the filtering action is increased with each filter unit including the fine filter unit 67 until the grease reaches the lower portion of the filter housing 51 where it is substantially free and clean of foreign particles. The advantage of having upwardly conical portions 69 and 81 is that the foreign particles filtered out of the grease tend to be washed outwardly along the conical portions and into the corners between the bands 68 and 82 and the conical portions thereby leaving the central areas of the conical portions substantially free for passage of filtered grease therethrough. Obviously the number of filter units 67 or 80 may be varied, as required.

The pump 109 continuously recirculates the fat through the apparatus thereby maintaining the fat substantially free and clean of carbon and other foreign particles in the tank 16 for optimum frying conditions. However, it may be found in certain operations that continuous recirculation of the fat is undesirable or unnecessary. If so, the timing switch 159 is opened and the timer 158 adjusted to turn the motor 108 on for a predetermined time and thereafter to turn it off for a predetermined time. Thus, for example, the pump may recirculate fat through the system for a fifteen minute period every hour rather than continuously. It will be noted by reference to FIG. 4 that whenever the motor is de-energized to stop recirculation of the grease, the solenoid 49 is de-energized to close the valve 48 so that grease will not continue to drain from the tank into the filter 50. Conversely, whenever the motor is energized, the solenoid 49 is energized to open the valve 48 and permit recirculation.

If the pump 107 forces liquid fat into the tank 16 faster than it is removed or discharged downwardly therefrom into the filter 50, the fat level in the tank may rise and contact the upper thermostatic switch 140. If so, the switch blade of the latter moves out of engagement with the contact 142, thereby de-energizing the motor 108 and turning off the pump 107, and into engagement with the contact 141 so as to keep the solenoid 49 energized and the valve 48 open. Thus, pumping of liquid fat from the filter into the tank is temporarily stopped until sufficient fat drains downwardly from the tank into the filter to emerse the upper thermostatic switch so that it will cool and the blade thereof will return to engagement with the contact 142. Also, if the instant system is used for double cooking units, employing two or more tanks 16, and if one tank or filter becomes clogged; or even with a single unit if the automatic reservoir valve 120 fails, then the upper thermostatic switch prevents overflow from the tank of excess grease which otherwise would be pumped into the tank.

Conversely, after continued operation of the apparatus, the supply of clean fat will continuously diminish until the level of fat in the tank 16 drops below the lower thermostatic switch 143. This switch cools and thereupon closes to energize the solenoid 122 thereby to open the valve 120. This also energizes relay 161 to close its contacts 160 and to disable the timer, if being employed, whereby operation of the motor is not interrupted while the reservoir valve is open. This releases liquid fat gravitationally from the reservoir through the hose 118 into the filter 50 whereupon the fat in the system is replenished. An additional amount of liquid fat is supplied from the reservoir to the system until the liquid level in the tank again contacts or submerges the lower microswitch.

After a predetermined period of operation, it is necessary to replace or clean the filter 50. For this purpose, the valve 44 is closed with the motor 108 continuing to run. The pump therefore continues to pump filtered grease from the filter into the tank 16 although flow of dirty grease into the filter is precluded. When the grease rises in the tank to a level where it contacts the upper thermostatic switch 140, the switch blade of the latter moves out of engagement with the contact 142 and into engagement with the contact 141. The motor is thereby de-energized to stop pumping of grease into the tank. The amount of grease remaining in the filter will depend on the total grease currently in the system; preferably the housing 51 is less than half full under such circumstances.

The fittings 46 and 100 are disconnected to permit pivoting of the filter housing 51 from its operating position to its outwardly inclined cleaning and replacement position. Of course, if it is desired to dump the filter contents, then the bolts 61 are removed. This relieves pressure on the microswitch button 132 so that the microswitch opens. If the filter is disconnected and pivoted outwardly without opening the master control switch 175, therefore, the opening of the microswitch acts as a safety feature since it positively disconnects the heaters 25 and 93 in the tank 16 and the filter, the electrical motor 108, and the solenoid 122 from the source of voltage. Since both the upper and the lower thermostatic switches 140 and 143 are submerged, the motor and the solenoid are already de-energized when the microswitch opens. However, if the fat should cool to a sufficiently low temperature during cleaning of the filter to cause the thermostatic switches to return to the positions they assume at room temperature, then the motor and the solenoid 122 still do not energize because of the open microswitch.

The cover 95 is then removed from the housing to permit access to the filter cartridge 66. The cartridge is removed, cleaned, and replaced, and the cover is returned to its position on the housing. The filter units 67 and 80 are easily and thoroughly cleaned in a dish washing machine, not shown. The housing 51 is then pivoted back into its operating position and connections to the outlet conduit 42 are made as believed evident. The master control switch 155 is opened; the outlet valve 44 and by-pass 47 are opened; and the manual reservoir valve 119 is closed all until the level of the grease in the tank 16 has dropped to a desirable cooking level. The by-pass 47 and the master switch are then closed and, when the fat is at the desired cooking temperature, the manual reservoir valve is opened. The system then continues to operate as described above.

From the foregoing, it will be evident that a system has been provided for filtering and recirculating liquid fat or grease which is particularly useful in a deep fat cooking apparatus. The system is particularly advantageous since it maintains grease in a desirably clean condition and minimizes hazards in the handling of such grease. It is automatically and continuously or intermittently operable, adjustable for various cooking conditions, and provides several safety features. Utilization of a system of the type described improves the conditions of sanitation in a restaurant in which it is employed as well as the character of the food served.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a deep fat fryer including a support and a tank mounted in the support adapted to hold liquid fat at elevated temperatures and having an upper fat inlet and a lower fat outlet, an apparatus for maintaining the fat in the tank at a predetermined level and for continuously recirculating and filtering the fat comprising a filter mounted in the support having an upper inlet connected in fluid communication with the lower outlet of the tank, a lower liquid outlet, and means in the filter for removing foreign particles from liquid fat passing from the inlet of the filter to the outlet thereof; a delivery conduit interconnecting the fat inlet in the tank and the outlet in the filter; a pump connected in the delivery conduit for recirculating liquid fat from the tank into the filter and back into the tank; a liquid fat reservoir having an outlet and being connected to pressure means for forcing such fat out of the reservoir through said outlet; a reservoir conductor providing fluid connection between the filter and outlet of the reservoir; a reservoir valve connected in the reservoir conductor; electromagnetic means connected to the valve for opening and closing the same whereby with the valve open, said pressure means passes fat from the reservoir into the filter; and a thermostat connected to the electromagnetic means and extended into the tank for operating the electromagnetic means to close the valve when submersed in liquid fat in the tank and for operating the electromagnetic means to open the valve when the level of the liquid fat in the tank falls below the thermostat.

2. In a deep fat fryer including a support and a tank mounted in the suppport and adapted to hold liquid fat at elevated temperatures and having a downwardly disposed outlet, an apparatus for maintaining the fat in the tank at a predetermined level and for continuously recirculating and filtering the fat comprising spaced bearing blocks mounted in the suppport below the tank and including opposed sockets; a filter including a housing having a lower liquid outlet, a cover releasably secured to the housing having an inlet, filtering means releasably mounted in the housing between the outlet of the housing and the inlet in the cover for filtering liquids passing through the housing, a heater in the housing for maintaining liquid fat therein at a predetermined temperature, and substantially horizontal trunnions secured to and outwardly oppositely extended from the housing and rotatably journaled in the sockets of the bearing blocks thereby mounting the housing for pivotal movement between an operating position in substantially vertical alignment with the tank and a cleaning position laterally outwardly inclined from said operating position, one of the trunnions being tubular and providing liquid communication between the interior of the filter and its respective socket; an outlet conduit releasably interconnecting the outlet of the tank and the inlet in the cover for releasing dirty fat into the filter, the tank having a fat inlet; a delivery conduit interconnecting the fat inlet in the tank and the socket in which the tubular trunnion is journaled; a pump connected in the delivery conduit for pumping filtered liquid fat from the filter back into the tank; a liquid fat reservoir having an outlet and being connected to pressure means for forcing such fat out of the reservoir through said outlet; a reservoir conductor providing fluid connection between the filter housing and the reservoir outlet; a reservoir valve connected in the reservoir conductor; electromagnetic means connected to the valve for opening and closing the same whereby with the valve open, said pressure means passes fat from the reservoir into the filter; and a thermostat connected to the electromagnetic means and extended into the tank for submersion in liquid fat therein during which time the reservoir valve remains closed but effective to trigger the electromagnetic means to open the reservoir valve when the fat level falls below a predetermined level and the theremostat is emersed from the fat.

3. In the deep fat fryer of claim 2, an electrical system including a source of voltage, an electrical motor mounted in the support and connected to the pump for driving the same, and an electrical switch mounted in the support having open and closed positions and an actuating element for opening and closing the switch, the source of voltage, the motor, and the switch being connected in series so that upon opening of the switch the motor is de-energized to turn off the pump and upon closing of the switch, the motor is energized to actuate the pump, the filter housing engaging the switch element to close the switch when the housing is in said operating position and being disengageable from the switch element to open the switch when the housing is in said cleaning position.

4. In the deep fat fryer of claim 3, an upper level thermostat connected in series with the voltage source, the motor, and the switch and extended into the tank above the thermostat connected to the electromagnetic means for de-energizing the motor when the fat level in the tank rises into contact with said upper level thermostat thereby to maintain the level of the fat in the tank at said predetermined upper level.

5. In a deep fat cooking apparatus including a tank adapted to contain liquid fat at a predetermined temperature and height and having an upper inlet and a lower outlet, a filter having an upper inlet and a lower outlet, a tank conduit interconnecting the outlet of the tank and the inlet of the filter for discharging fat from the tank into the filter, an electrically operated valve having open and closed positions connected in the tank conduit for allowing and blocking fluid flow therethrough, a delivery conduit interconnecting the outlet of the filter and the inlet of the tank, and a pump connected in the delivery conduit for pumping liquid fat from the filter into the tank; an electrical system comprising a source of voltage, a motor connected to the pump for driving the same, a solenoid having an armature connected to the valve and a coil, and an electrical timer in series circuit with the motor, the coil and the source of voltage for intermittently opening and closing the circuit to energize and de-energize the motor and the solenoid thereby to turn the pump on and off and to open and close the valve.

6. The electrical system of claim 5 including a thermostatic switch mounted in the tank for immersion in liquid fat in the tank upon rise of the fat to a predetermined level and connected in circuit with the timer, the motor and the solenoid coil, the switch having a first position at normal room temperatures completing the series circuit connection of the motor, the timer and the coil with the voltage source and a second position when immersed in liquid fat at a predetermined temperature disconnecting the timer and the motor from the source to de-energize the motor but maintaining connection of the solenoid to the source whereby the pump is turned off but the valve remains open to allow liquid fat to continue to drain into the filter.

7. In the apparatus of claim 5 further including a reservoir adapted to contain a reserve of liquid fat and having an outlet, a reservoir conduit interconnecting the reservoir outlet and the filter, and an electrically operated valve connected in the reservoir conduit having open and closed positions for allowing and blocking fluid flow from the reservoir to the filter, the electrical system also providing a thermostatic switch mounted in the tank for immersion in liquid fat in the tank and adapted to be emersed from the fat upon lowering of the fat to a predetermined level, a reservoir solenoid including an armature connected to the reservoir valve and a coil, and a relay including a pair of normally open contacts connected in parallel with the timer and a coil adapted upon energization to close the contacts and short out the timer, the thermostatic switch, the relay and reservoir solenoid coils being connected in series with the source of voltage, the thermostatic switch being open when immersed in fat at a predetermined temperature and closing when emersed from the fat to energize the reservoir solenoid thereby to allow fat from the reservoir to flow into the filter and to energize the relay to short out the timer and insure continued action of the motor while the tank is being replenished with fat from the reservoir.

References Cited in the file of this patent

UNITED STATES PATENTS

| 942,121 | White | Dec. 7, 1909 |
| 1,169,826 | Horan | Feb. 1, 1916 |
| 1,942,132 | Blinn | Jan. 2, 1934 |
| 2,078,641 | Spencer | April 27, 1937 |
| 2,270,327 | Mills | Jan. 20, 1942 |
| 2,338,964 | Pappas | Jan. 11, 1944 |
| 2,533,624 | Ray | Dec. 12, 1950 |
| 2,546,163 | McBeth | Mar. 27, 1951 |
| 2,578,129 | Daugherty | Dec. 11, 1951 |
| 2,715,869 | Salvo | Aug. 23, 1955 |